Nov. 13, 1951 E. KRONISCH 2,575,175
PROCESS OF MAKING PHARMACEUTICAL PREPARATIONS
Filed Aug. 16, 1949
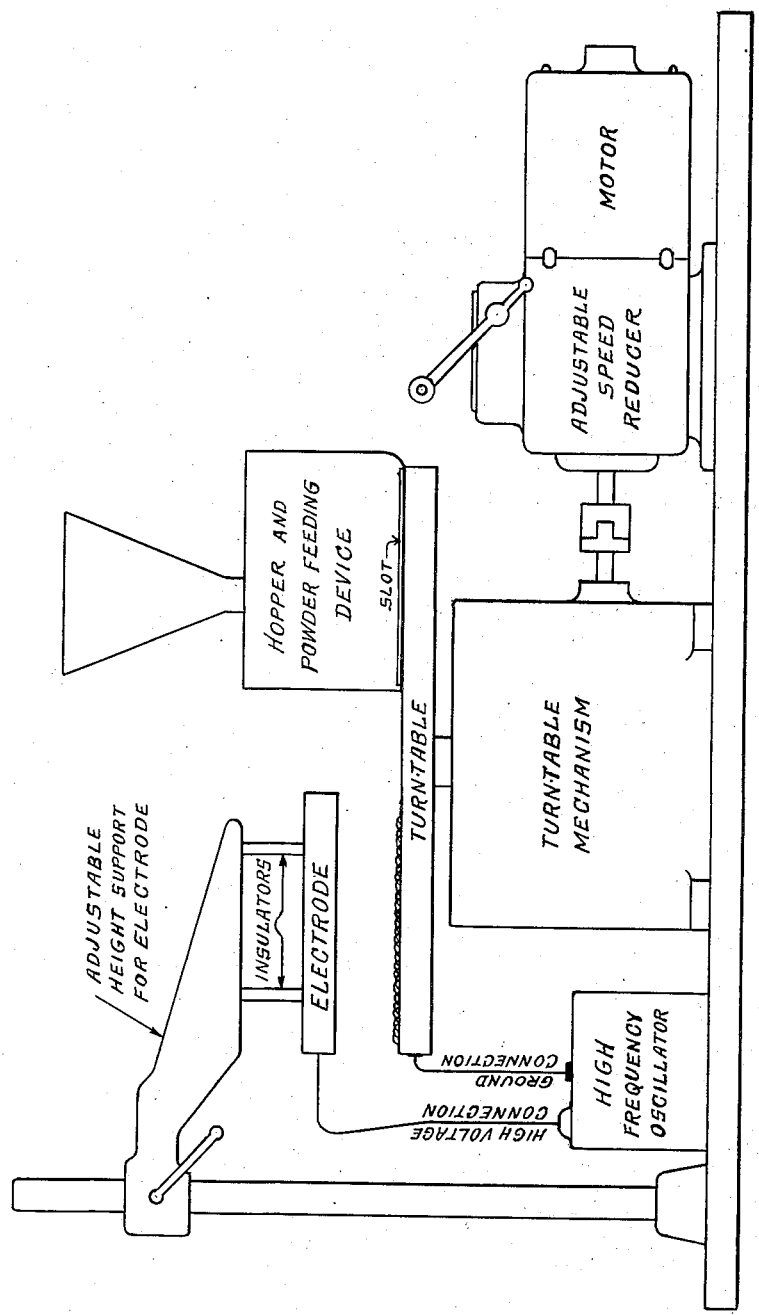
INVENTOR.
EUGEN KRONISCH
BY
ATTORNEY Patented Nov. 13, 1951

2,575,175

UNITED STATES PATENT OFFICE 2,575,175

PROCESS OF MAKING PHARMACEUTICAL PREPARATIONS

Eugen Kronisch, New York, N. Y.

Application August 16, 1949, Serial No. 110,551

2 Claims. (Cl. 99—2)

This invention relates to the preparation of proteins or amino acids from animal blood, particularly blood of beef cattle and sheep, to render them in condition for human consumption because of their nutrient and medicinal values.

The proteins or amino acids have been the subject of considerable research work because of their value for human nutrition and as medicinal agents. Researches in such field have asserted that there are 23 known amino acids which are beneficial to humans as nutrients and as medicinal agents and that some of such amino acids are necessary or essential for normal human metabolism. As far as is aware, the following amino acids are listed as being essential: Arginine, histidine, isolucine, leucine, lysine, methionine, phenylalanine, threonine, tryptophane, valine. There are other amino acids which, while not considered essential, are regarded as important in nutrition. It is the generally accepted belief that the best known source for such amino acids is animal blood, particularly the blood of beef cattle and sheep.

It is the generally accepted opinion of workers in this field that the systems of some humans are incapable of converting proteins into the required amino acids although they may consume food stuffs which would supply the normal human system with the required amount of protein necessary to avoid malnutrition. Scientific workers, in order to supply such humans with the required proteins, have treated protein-bearing substances, such as animal blood and casein, in order to convert the protein value thereof to a form in which they are assimilable by humans as nutrients or medicinal agents. In order to so convert such materials, they have been subjected to hydrolysis. One of the outstanding disadvantages of hydrolysis resides in the fact that the product has a bad odor and taste, resembling that of decomposed animal matter and therefore highly objectionable. It has also been stated that other factors, beneficial to humans, while known to be present in the starting material, were not identifiable after hydrolysis and it is assumed that such other factors have been destroyed by hydrolyzation.

Although animal blood, such as that of beef cattle, has been recognized as a valuable protein or amino acid-bearing material, it has not been made generally available as a pharmaceutical because of the difficulties encountered in converting it to a form readily administrable to humans. Pharmaceutical manufacturers have therefore generally used casein, because of its protein or amino acid-bearing content and in order to make it assimilable by humans it has been hydrolyzed. Hydrolyzation, as heretofore explained, converts the casein into a form which has a bad odor and taste. The foregoing difficulties in the preparation of animal blood and casein have and do constitute a problem which has been of great concern to pharmaceutical manufacturers and the medical profession.

The object of this invention is to make available for human consumption all of the proteins or amino acids present in animal blood, particularly the blood of beef cattle and sheep, without diminishing their effectiveness. The product of this invention is entirely free of bad odor and taste and may be taken by mouth without discomfort or nausea. The proteins or amino acids, by the process of this invention, are converted to a condition whereby they are rendered readily assimilable by the human system.

A further object of this invention is to provide the protein or amino acids present in animal blood, particularly that of beef cattle and sheep, in the form of a powder of small and dispersed molecules, substantially tasteless, excepting for a slightly saline taste, capable of being taken by mouth in measured quantities without discomfort and readily assimilable by the human system. The product of this invention may be administered in the forms of tablets or wafers incorporated in a suitable vehicle or extender, such as chalk, it may be mixed with fruit juices or other drinks, such as malted milk or chololate or in syrups. When so mixed the said product does not change or effect the normal taste of such drinks or vehicles, although contributing thereto the highly beneficial proteins or amino acids.

In order to illustrate this invention, the following example is given in connection with the process of treating blood of beef cattle. The same process may also be used to treat sheep blood and productive of a like product.

The blood of beef cattle is collected, simultaneously with the slaughter of the animal, in stainless steel pitchers having a capacity of approximately 1½ gallons. Before the blood is collected, there is introduced into each pitcher about 250 cc. of a solution made up of 0.4% of sodium phosphate, 0.6% of sodium citrate and 0.5% of sodium chloride, and distilled water. The solution is adjusted with trisodium phosphate to pH 6.9. The filled pitchers are immediately emptied into standard milk cans which have first been sterilized. The cans containing the collected animal blood are refrigerated for 4-5 hours at approximately 32° F. After the period of refrigeration, the blood is tested for sodium chloride concentration, which concentration should not fall below substantially 0.9%, and if below such percentage, its sodium chloride concentration is adjusted to substantially 0.9%. The blood is then centrifuged in a suitable centrifuge, such as a Sharpless 16A, in order to separate the hemoglobin from the plasma. The plasma, which contains the fibrinogen and serum, is introduced into sterilized milk cans and gradually cooled to 40° F. and stored at a temperature of from 32-34° F. for approximately 8 hours. The plasma is then irradiated for the purpose of sterilizing it and increasing its vitamin A content. Such irradiation may be carried out with a Hanovia ultraviolet tube machine. Immediately after irradiation, the plasma is spray dried, for which purpose a Bowen spray drying machine may be used.

The spray drying results in a fine loose powdery material, substantially dry (the amount of moisture present not being in excess of one-half of 1%) and capable of maintaining such state when suitably packed. The spray dried material is then radiated with an electronic tube, the wave length of which is 6.10 meter. Such wave length may vary either way by 0.10, viz. to 6.00 meter or 6.20 meter. A suitable device for carrying out the last mentioned step is shown schematically in the accompanying drawing.

Legends, identifying the several parts, are applied to each part of the drawing from which the function and operation of the device is readily understandable. It might be explained that the feed hopper has a slot therein of such dimension as to deposit a layer of the powder upon the turn table to a depth of substantially $\frac{1}{16}$ of an inch. The material, after it has been acted upon by the radiations from the electrode and has passed beyond the influence thereof, is removed from the turn table, by a suitable blade or scraper, for packing.

The material is deposited upon the turn table to a depth of approximately $\frac{1}{16}$ of an inch. The speed of operation of the turn table is such as to expose the material to the radiation from the electrode for a period of from 2 to substantially 10 seconds, but it is preferred to so expose the material for approximately 10 seconds. The material, while being treated by the radiations from the electrode, is not cooked in whole or in part, nor is its normal temperature raised substantially.

The incoming current to the electronic tube or high frequency oscillator should be maintained at 230 volts and 10 amperes. The high frequency through the powder is approximately 400 watt. Immediately upon radiation by the electronic tube, the product should, if it be desirous to store it, be packed in air tight tins, first treated with nitrogenous gas and the tins sealed.

The final product contains all of the beneficial proteins or amino acids present in the animal blood starting material. It is a free flowing powder of white-yellowish color and dispersed small molecules and free of the objectionable blood-red color. It is sterile, readily soluble in water, fruit juices and other drinks, such as malted drinks, milk, chocolate, etc., in which form it may be taken by mouth by the consumer. The powder may be mixed in measured amounts with suitable extenders or vehicles and formed into tablets or wafers, each tablet or wafer containing a definite amount of the product. The powder does not change or impart a disagreeable odor or taste to other materials with which it is mixed. In fact, it does not change the odor or taste of such products. The product of this invention is in such condition, both physically and chemically, that it is readily assimilable by human systems which normally are incapable of deriving the nutrient and medicinal value from food stuffs containing some or substantially all of the essential or beneficial proteins or amino acids present in such food stuffs.

It has not been established whether animal blood, treated according to this invention, is changed either physically or chemically or both physically and chemically, but it is evident from the research work that has been done with the product that all of the amino acids present in the original animal blood are present in the final product and have been converted into a condition in which they are readily assimilable by human systems.

I claim:

1. The process of preparing a pharmaceutical from beef cattle blood, comprising collecting the blood from a plurality of animals immediately upon slaughter, into containers in which there has been previously introduced a solution of sodium phosphate, sodium citrate and sodium chloride having a pH of substantially 6.9, introducing the blood so collected into larger containers, refrigerating such blood for several hours at approximately 32° F., testing the refrigerated blood for sodium chloride concentration and adjusting it to substantially 0.9% sodium chloride concentration; centrifuging the blood to separate the hemoglobin from the plasma, collecting the plasma and cooling the same and storing it at a temperature approximating 32° F. for approximately 8 hours, subjecting the plasma to ultraviolet treatment, spray drying the plasma to a powder with a moisture content not substantially in excess of one-half of one per cent, and finally subjecting the powder to action of radiation from an electronic field, the wave length of such radiation being substantially 6.10 meter.

2. The steps in the method of preparing a pharmaceutical from beef cattle and sheep blood, comprising collecting the blood immediately upon slaughter of the animals, centrifuging the blood to separate the hemoglobin from the plasma, cooling the plasma and storing it for several hours at a temperature approximating 32° F., subjecting the plasma to ultra-violet irradiation, drying the plasma to a powdery condition and subjecting the powder to the action of radiation from an electronic field, the wave length whereof is substantially 6 meter.

EUGEN KRONISCH.

REFERENCES CITED

The following references are of record in the file of this patent:

UNITED STATES PATENTS

| Number | Name | Date |
|---|---|---|
| 1,614,337 | Atwood | Jan. 11, 1927 |
| 2,241,868 | Reimann | May 13, 1941 |
| 2,281,989 | Parfentjev | May 5, 1942 |

OTHER REFERENCES

"Blood Fractionation," Chem. & Met. Eng. by J. R. Callaham, June 1946.

"Ultraviolet Irradiation of Human Plasma," J. A. M. A., October 25, 1947.

"Blood Products," Clinical Medicine, December 1946.